United States Patent
Saberan et al.

(10) Patent No.: US 7,677,656 B2
(45) Date of Patent: Mar. 16, 2010

(54) MODULAR SEAT/CONSOLE FOR A VEHICLE

(75) Inventors: Mohammad Saberan, New Baltimore, MI (US); James Klein, Rochester Hills, MI (US); Brian D. Phillips, Almont, MI (US); David Kolena, Bloomfield Hills, MI (US); Wee Gam, Troy, MI (US); Sanjay Vakil, Troy, MI (US); Artur W. Dlugosz, Sterling Heights, MI (US); Fred Kresky, Rochester Hills, MI (US); Kyle Calvert, Sterling Heights, MI (US); Daniel Kirk, Taylor, MI (US)

(73) Assignee: Lear Corporation, Southfield, MI (US)

( * ) Notice: Subject to any disclaimer, the term of this patent is extended or adjusted under 35 U.S.C. 154(b) by 740 days.

(21) Appl. No.: 11/275,512

(22) Filed: Jan. 11, 2006

(65) Prior Publication Data

US 2007/0158979 A1 Jul. 12, 2007

(51) Int. Cl.
*A47C 7/62* (2006.01)
*A47C 15/00* (2006.01)
*B60N 2/02* (2006.01)

(52) U.S. Cl. ............... 297/188.04; 297/257; 297/378.1
(58) Field of Classification Search ................. 297/257, 297/378.1, 344.1, 188.04, 340–341, 248, 297/125, 344.12, 344.13; 296/65.09, 65.01, 296/65.16
See application file for complete search history.

(56) References Cited

U.S. PATENT DOCUMENTS

| | | | |
|---|---|---|---|
| 3,572,818 A | 3/1971 | Lohr | |
| 4,341,415 A * | 7/1982 | Braun et al. | 296/64 |
| 4,533,175 A | 8/1985 | Brennan | |
| 5,039,155 A | 8/1991 | Suman et al. | |
| 5,611,589 A * | 3/1997 | Fujii et al. | 296/64 |
| 5,788,324 A | 8/1998 | Shea et al. | |
| 5,947,554 A | 9/1999 | Mashkevich | |
| 5,951,084 A | 9/1999 | Okazaki et al. | |
| 6,135,529 A | 10/2000 | De Angelis et al. | |
| 6,378,941 B1 * | 4/2002 | Opfer et al. | 297/257 |

(Continued)

FOREIGN PATENT DOCUMENTS

FR 2718398 A1 4/1994

(Continued)

OTHER PUBLICATIONS

GB Search Report under Section 17(8) dated Mar. 31, 2008 for GB Application No. GB0700375.9.

*Primary Examiner*—Milton Nelson, Jr.
(74) *Attorney, Agent, or Firm*—Brooks Kushman P.C.

(57) ABSTRACT

A center seat console that moves between a forward position between front seats, an intermediate position, and a rear position between rear seats is disclosed. The seat/console may function as a seat in the rear seat position, or in the intermediate position. In the intermediate position, the seat/console in the seat configuration may advantageously be used to support a child safety seat. The seat/console may also be configured as a console in either the rear seat, intermediate, or front seat positions. The seat/console is provided with an adjustable height support that permits the seat/console to be lowered to fit beneath arm rests assembled to the front seats when it is desired to place the console between the front seats.

15 Claims, 4 Drawing Sheets

U.S. PATENT DOCUMENTS

| | | |
|---|---|---|
| 6,497,443 B2 | 12/2002 | Worrell et al. |
| 6,547,331 B2 * | 4/2003 | Kunisawa et al. ........ 297/344.1 |
| 6,572,171 B1 | 6/2003 | Pautz et al. |
| 6,626,481 B2 * | 9/2003 | Kawasaki ................ 296/65.01 |
| 7,341,302 B2 * | 3/2008 | Slade ..................... 296/65.01 |
| 2003/0234550 A1 | 12/2003 | Brooks et al. |

FOREIGN PATENT DOCUMENTS

| | | |
|---|---|---|
| JP | 11321465 | 5/1998 |
| JP | 2000264109 | 3/1999 |
| JP | 2001001805 | 6/1999 |
| JP | 2001301496 | 4/2000 |
| JP | 2003080982 | 9/2001 |
| JP | 2004249928 | 2/2003 |
| JP | 2005075266 | 9/2003 |
| JP | 2005075265 | 3/2005 |
| JP | 2007083787 | 9/2005 |
| JP | 2007083789 | 9/2005 |

* cited by examiner

MODULAR SEAT/CONSOLE FOR A VEHICLE

BACKGROUND OF THE INVENTION

1. Field of the Invention

The present invention relates to a seating arrangement and modular center seat/console that is mounted on a track and may be positioned in a range of fore-and-aft locations relative to front and rear rows of seats.

2. Background Art

The versatility of sport utility vehicles (SUVs), vans and other special purpose vehicles is derived, in part, from flexible seating arrangements. Seats for such vehicles may have a seating orientation, a console orientation, and a storage orientation. In the seating orientation, a seat base and seat back are provided with the seat back being in an inclined generally vertical orientation. In the console orientation, the seat back is generally oriented in an overlying relationship substantially parallel to the seat base. A wide range of different storage orientations have been developed, for example, complete removal of the seats from the vehicle, or folding the seat to a floor storage position.

Seats that convert to consoles tend to be bulky and difficult to accommodate in prior art seating arrangements. The height of the seat must be comfortable for a person sitting in the seat and the height of the converted console must be appropriate for use as an armrest, table, cup holder or the like. Convertible seats/consoles tend to be relatively heavy and difficult to manipulate due to the size of the convertible seat/consoles.

Sport utility vehicles and vans are popular family vehicles. Young children are recommended to ride in child safety seats or on booster seats that are secured to a seat in the rear or second row of the vehicle. Airbags mounted in the dashboard and other interior locations may make it inappropriate to have a child ride in the front seat of a vehicle. One problem with seating children in rear seating areas is that it is difficult to reach and communicate with the child from the front row seats. Child safety seats are often positioned in a rear seat adjacent to one side of the vehicle. Placing a child safety seat on one side of a vehicle reduces seating available for adults. In addition, placing a child safety seat near the center of the vehicle provides the safest position in the car in the event of a collision.

Center consoles between spaced seats of a vehicle generally prevent the seats from being arranged as a bench seat. Center consoles are also normally relegated to either a front seat or a rear seat position. The same console normally cannot be used in the front and rear row of seats in a vehicle. When a SUV or van is used for hauling cargo, it is frequently a benefit if a center console can be completely removed to maximize cargo carrying capacity.

There is a need for a center seat/console for a vehicle that is modular in design and can be easily converted between different functional positions.

SUMMARY OF THE INVENTION

According to one aspect of the present invention, the seating arrangement for a vehicle interior is provided. Front and rear rows of seats each have spaces provided between right and left seats. A track extends from the space between the front seats to the space between the rear seats. A modular seat/console is assembled to the track for movement along the track. The modular seat/console may be moved to an intermediate position relative to the first and second spaces in front of the rear row of seats and behind the front row of seats. The modular seat/console may be locked in the intermediate position.

According to other aspects of the invention, a child safety seat may be secured to the modular seat/console. The track may have a port, or opening, located at a point along a length of the track through which the modular seat/console may be either assembled to the track or removed from the track.

According to other aspects of the invention, an articulated linkage may be provided that connects the seat base to the track. The articulated linkage may comprise vertically elongated links extending between the seat base and the track that have pivots on an upper end and on a lower end. The links, seat base and track may cooperate to form an articulated linkage. A lock may be provided for the articulated linkage to allow the linkage to be selectively locked in a raised position in which the modular seat/console is disposed at a first height relative to the track. The articulated linkage may also be selectively locked in a lowered position wherein the modular seat/console is disposed at a second height that is lower than the first position.

According to another aspect of the present invention, a modular center seat/console is provided for a vehicle interior. The vehicle interior has a front row of seats arranged with a first space between a left front seat and a right front seat. The front seats include an arm rest at a first height relative to the track. A rear row of seats is arranged with a second space between a left rear seat and a right rear seat. A track extends from the first space to the second space. The modular center seat/console comprises a seat base and a seat back that may be set up in a position to form a bench seat in conjunction with the left rear seat and the right rear seat in a first position. The seat back may be folded over the seat base to form a center console in a second position. The center seat/console is assembled to the track for movement between the first space and the second space. The modular center seat/console is disposed at a second height that is above the height of the arm rest of the front seat when the seat/console is behind the front seats. The seat/console may be adjusted vertically to be disposed at a third height that is below the first height when in the front row so that the modular seat/console fits below the arm rests of the front seats.

According to other aspects of the invention as they relate to the modular center seat/console, a plurality of legs may be provided that support the seat base relative to the track. The angular orientation of the legs may be changed and locked in one of a plurality of positions to change the height of the seat base. The seat back may not be placed in the first position with the seat back up at a location forward of a predetermined position. A lock may be provided that secures the modular center seat/console in a selected position on the track. The lock may be used to selectively secure the modular center seat/console to the track in a rearmost position between the left rear seat and the right rear seat. The lock may selectively secure the seat/console between the left front seat and the right front seat when folded to form a console. In addition, the lock may be used to lock the seat/console in an intermediate position relative to the first and second spaces in front of the rear row of seats and behind the front row of seats.

According to other aspects of the modular center seat/console invention, the right and left rear seats may be attached to the vehicle for movement between a sub-floor stowed position in a stowage well and a seating position. The vehicle floor may have a nominal height wherein the track is secured to the vehicle floor without extending above the nominal height of the floor.

According to another aspect of the invention, a modular center seat/console assembly for a vehicle is provided that is assembled to a track that extends between a first row of seats and a second row of seats. The modular center seat/console assembly comprises a seat base and a seat back that is pivotally attached to the seat base for movement between a seating position and a console position. An articulated linkage connects the seat base to the track on the floor of the vehicle. The linkage is adjustable to change the spacing between the seat base and the floor of the vehicle when the seat back is in the console position. The modular center seat/console assembly is movable fore-and-aft between two rows of seats. The height of the modular center seat/console assembly may be adjusted to different heights depending upon whether the modular center seat/console assembly is located near the first or second rows of seats.

According to still further aspects of the invention, the articulated linkage may comprise at least two four bar links wherein the seat base is one of the links and a carriage that attaches to the track is one of the links and the other links are members that extend vertically between the seat base and the carriage. The seat back may have a rear surface in the first position that is reoriented to be a top surface in the second position that may be provided with cup holders and a table top surface or the like.

These and other aspects of the invention will be better understood in view of the attached drawings and the following detailed description.

DETAILED DESCRIPTION OF THE PREFERRED EMBODIMENT(S)

Figure 1:
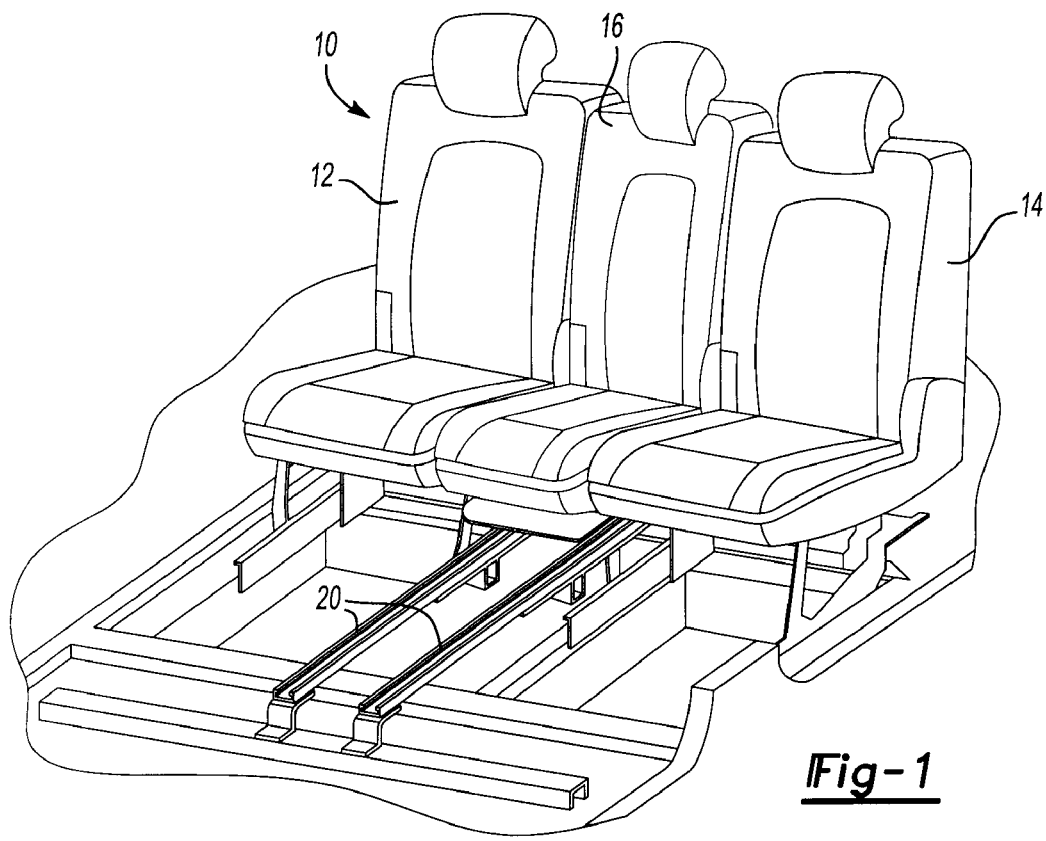
FIG. 1 is a perspective view of a combination rear seat in a vehicle.

Referring to FIG. 1, a combination rear seat 10 is shown to include a right side seat 12 and a left side seat 14. The right and left side seats 12 and 14 may be referred to as 40% seats in that they each make up approximately 40% of the width of the entire combination rear seat 10. A center seat 16 is disposed between the right side seat 12 and left side seat 14. The center seat may be referred to as a 20% seat because it makes up 20% of the width of the combination rear seat 10. The center seat 16 is attached to and movable relative to a pair of parallel tracks 20. The center seat 16 is movable between the rear seat 10 and spaced front seats as will be more specifically described below.

Figure 2:
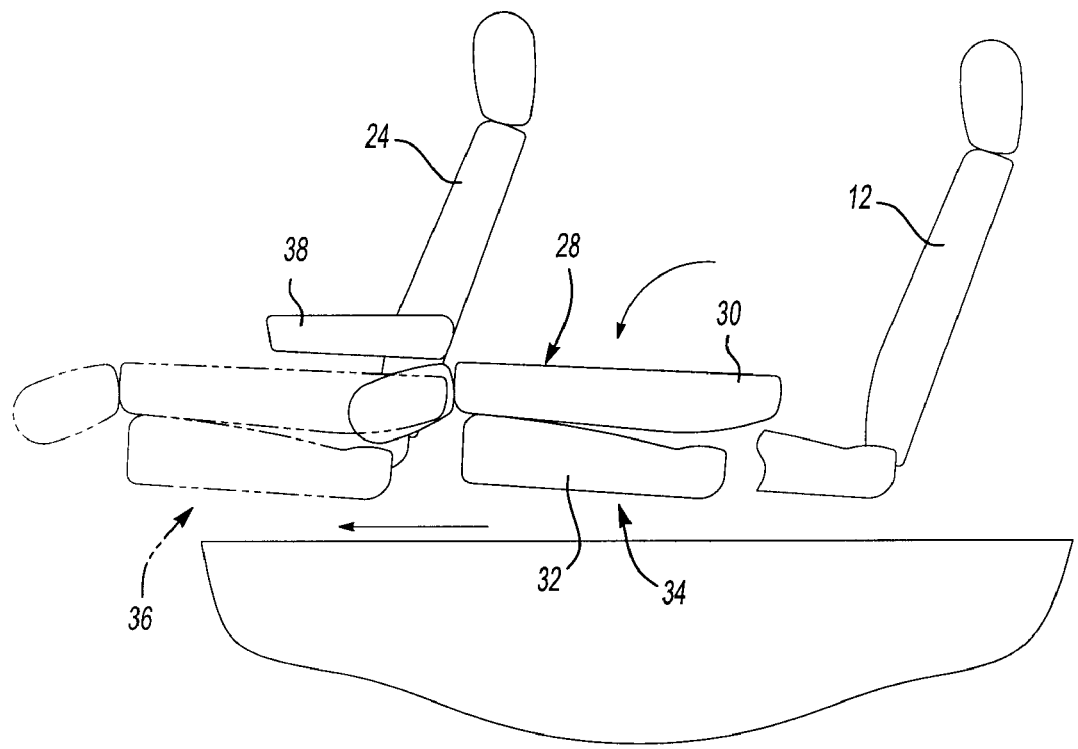
FIG. 2 is a diagrammatic side elevation view showing a center console in an intermediate position.
Figure 3:
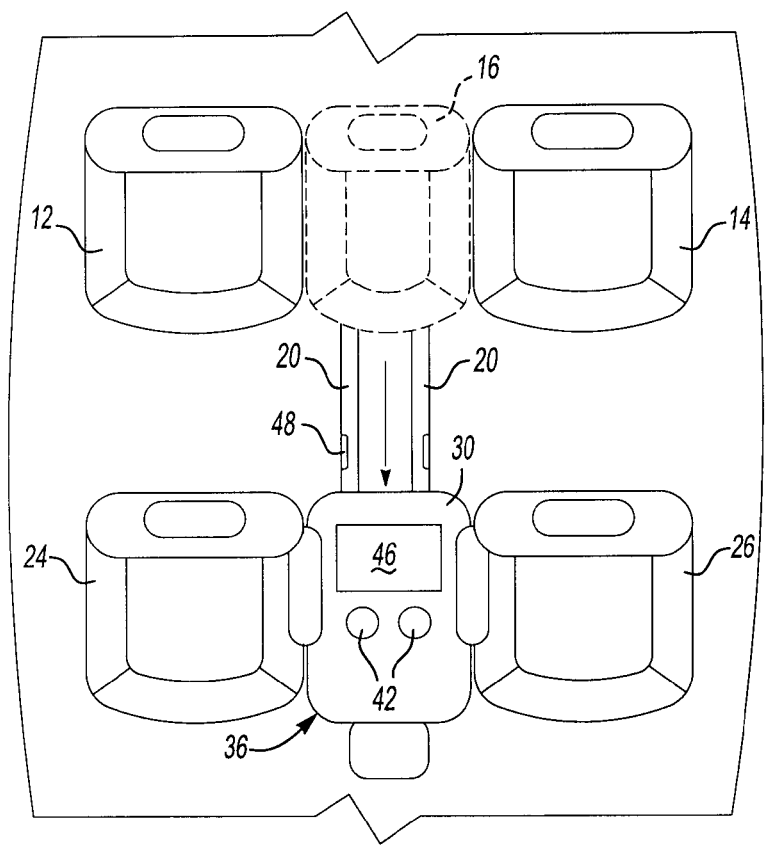
FIG. 3 is a top plan view of a vehicle interior including front seats and rear seats with a movable center seat/console.

Referring to FIGS. 2 and 3, a right front row seat 24 and left front row seat 26 are disposed in front of the rear seat combination 10. The center seat 16 is shown in FIG. 2 in a console configuration, generally indicated by reference numeral 28, in which the seat back 30 is folded over and overlies the seat base 32. The seat in the console configuration 28 is shown in an intermediate position 34 forward of the rear seat 10, but generally behind the front seats 24 and 26. As shown by phantom lines in FIG. 2 and by solid lines in FIG. 3, the console 28 may be moved to a front console position, generally indicated by reference numeral 36. In the front console position 36, the console 28 must be provided with clearance relative to the arm rest 38.

Referring to FIG. 3, the center seat 16 is shown in phantom lines indicating its position when part of the rear seat combination 10. The seat/console is movable as indicated by the arrow between the two parallel tracks 20. Seat back 30, when in the console position, features cup holders 42 and a storage compartment 44 that may be closed by a door 46. The door 46 covering the storage compartment 44 may be opened to provide access to the storage compartment 44. The parallel tracks 20 may include removal notches 48 that allow the seat/console to be selectively removed from the tracks 20.

Figure 4:
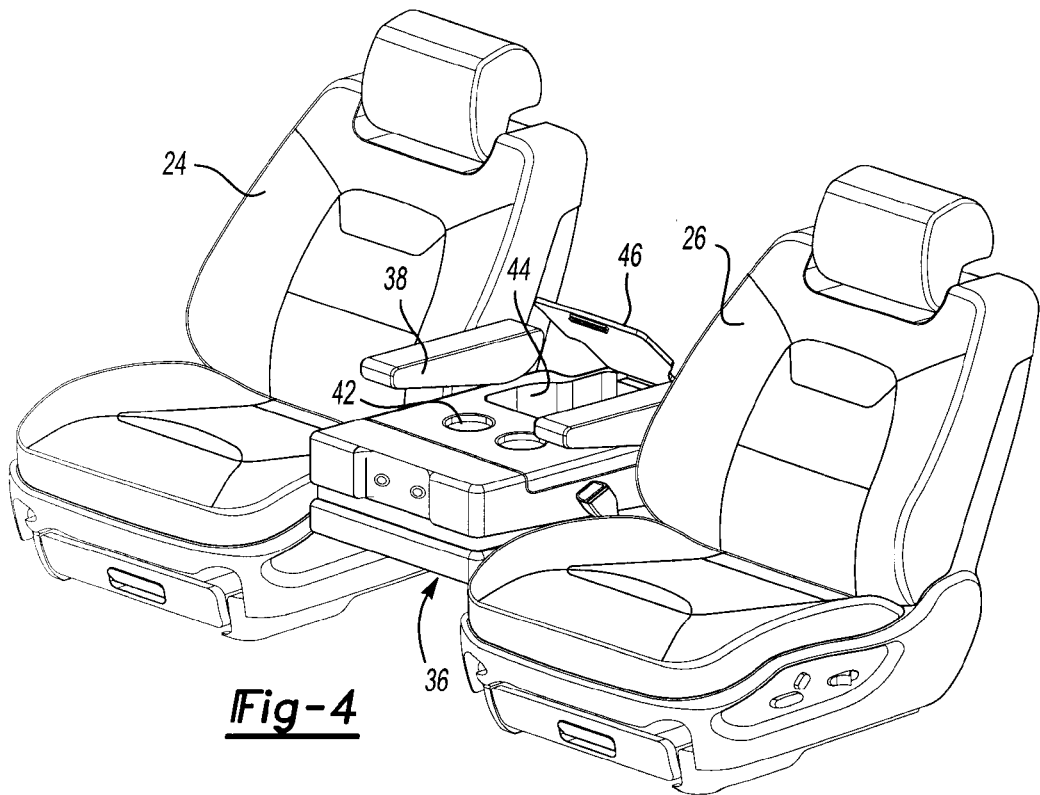
FIG. 4 is a perspective view of a center console between the front seat of a vehicle.

Referring to FIG. 4, when the seat/console 28 is disposed between the right front row seat 24 and left front row seat 26 it must be lowered to fit below the arm rests 38. The arm rests 38 of the front seats 24, 26 cooperate with the console 28 when it is between the front seats 24, 26.

Figure 5:
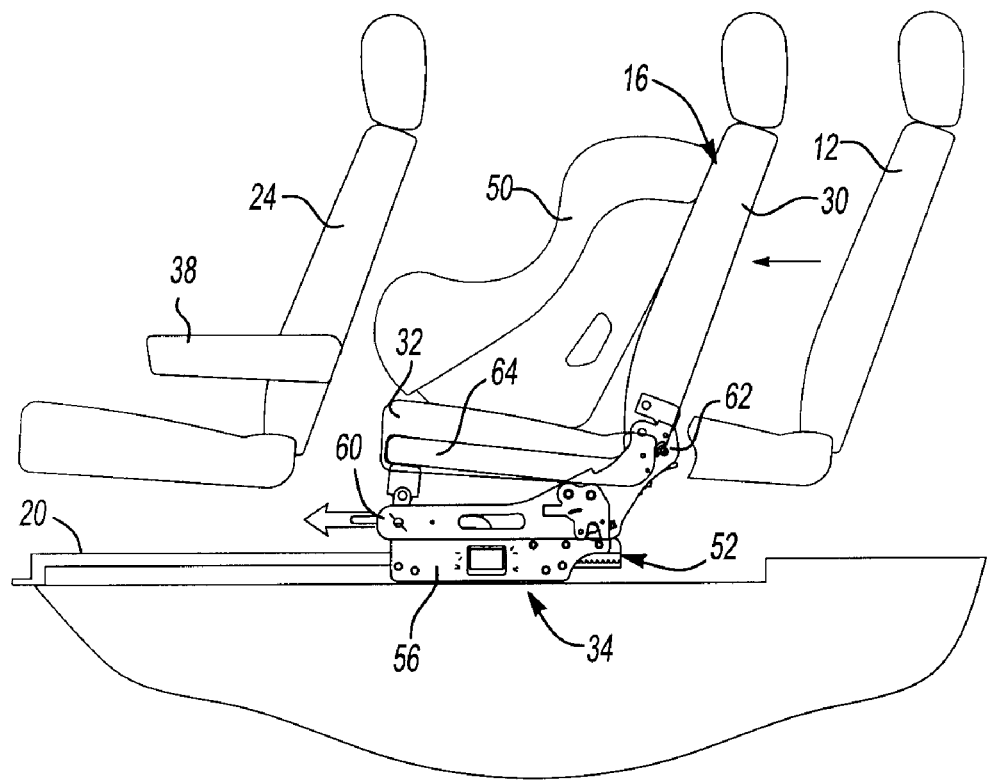
FIG. 5 is a side elevation view of a vehicle interior with a center seat supporting a child seat in an intermediate position.

Referring to FIG. 5, the center seat 16 is shown in an intermediate or child presentation position that is in front of the rear seats 10, yet behind the front seats 24 and 26. With the center seat 16 in this position, a person may assist a child in a child seat 50 that is secured to center seat 16. In this position, a parent can easily reach a child in the child seat and give the child a toy, pacifier or bottle easier than if the center seat 16 were aligned with the rear seats 12 and 14. To allow the seat/console to move between the front seats, the seat/console is provided with an adjustable height seat/console support 52. When the seat back 30 is folded over the seat base 32, the seat/console is too high to pass beneath the arm rest 38 that is assembled to the right front row seat 24.

The adjustable height seat/console support 52 has a side plate 54 that is attached to a carriage portion 56. The carriage portion 56 functions to guide the movement of the seat/console along the tracks 20. A height adjuster portion 60 permits the height of the seat/console to be reduced to pass beneath the arm rest 38 when the seat/console is moved between front seats 24 and 26.

Figure 6:
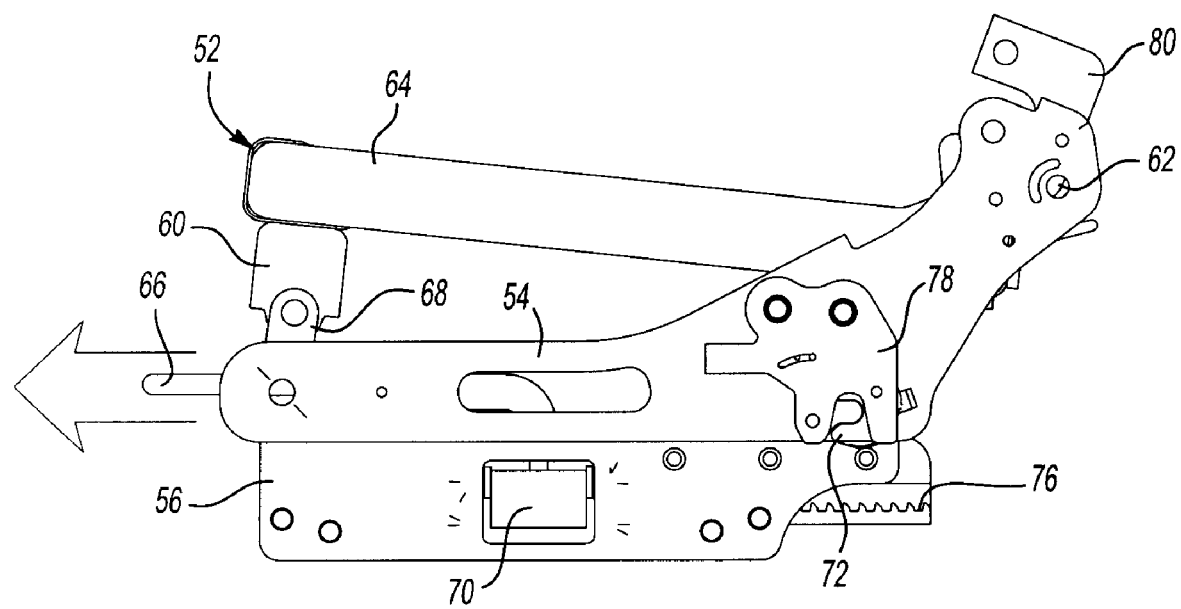
FIG. 6 is a side elevation view of an adjustable height seat/console support.

Referring to FIGS. 5 and 6, the adjustable height seat/console support 52 will be described in greater detail. The interconnection between seat back 30 and seat base 32 includes a tilt hinge 62 that allows the angular orientation of the seat back 30 to be changed relative to the seat base 32. The seat base 32 includes a seat base frame 64. Padding, upholstery and other components of a vehicle seat are assembled to the seat base frame 64. The seat base frame 64 is shown without the other portions of the seat in FIG. 6 to better show operative components of the adjustable height seat/console support. A release bar 66 is provided that may be manipulated to release the carriage portion 56 so that the seat/console may move along the parallel tracks 20. The height adjustment portion 60 includes an articulated forward leg 68 that may be moved between a raised position as shown in the drawings and a lowered position, as will be more fully described below. An interlock 70 interlocks the release bar 66 with the carriage portion 56. The interlock 70 prevents the seat/console from moving into the front row position unless the seat back 30 is folded over the seat base 32 in the console position.

A clock spring 72, or power spring, is provided to counterbalance the seat/console as it is moved by the adjustable height support 52 between the raised and lowered positions.

The carriage portion 56 is mounted on a rack 76 that is associated with one or both of the tracks 20. The rack 76 is engaged by a gear (not shown) on the carriage portion 56 that allows for adjustment of the seat/console in the fore and aft direction.

Figure 7:
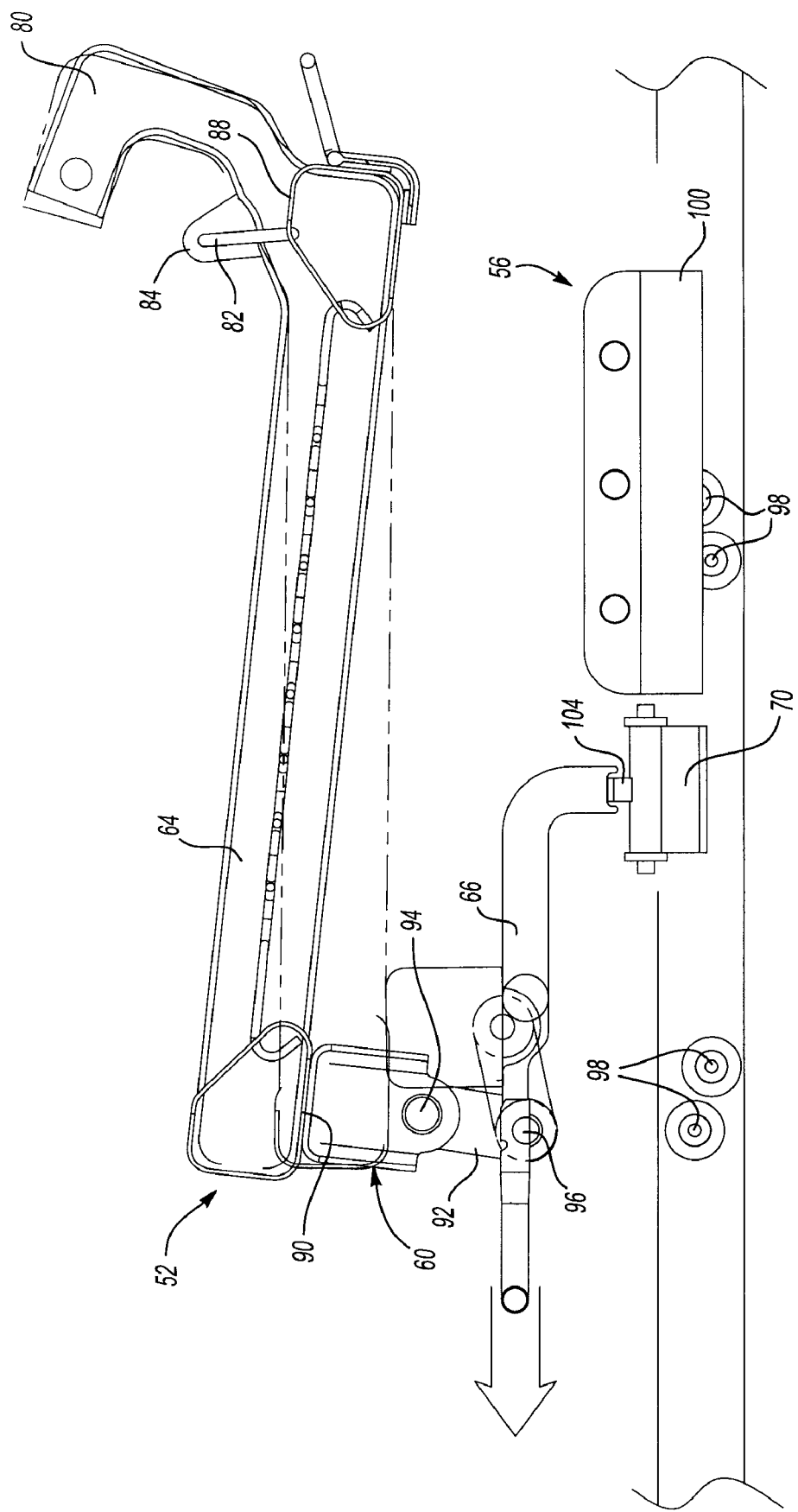
FIG. 7 is a fragmentary diagrammatic side elevation view of an adjustable height seat/console support.

Referring to FIGS. 6 and 7, a back attachment frame portion 80 is shown by which the seat back 30 is attached to the seat base 32. The seat base frame 64 is supported on its front end by the articulated forward leg 68 and is supported on its rear end on a support loop 82 that is secured to a bracket 84. The support loop 82 interconnects the bracket 84 with a rear bar 88 of the seat base frame 64. The seat base frame 64 is movable from its raised position, shown in solid lines in FIG. 7, to a lowered position, shown in phantom lines in FIG. 7.

A fixed bar 90 is secured to the front end of the seat base frame 64. A pivot link 92 interconnects the fixed bar 90 with the side plate 54. Upper pivot pin 94 connects the pivot link 92 to the fixed bar 90. A lower pivot pin 96 connects the pivot link 92 to the side plate 54 of the adjustable height seat/console support 52. The articulated forward leg 68 is moved from its raised position, shown in solid lines in FIG. 7. The release bar 66 is manipulated to cause the pivot link 92 to rotate in a clockwise direction as shown in FIG. 7 to the position shown in phantom lines. The pivot link in the raised position extends in a generally vertical orientation, while in the lowered position the pivot link extends in a generally horizontal direction. The terms vertical and horizontal as used herein are not used in their strict literal sense, but refer to the general orientation of the pivot link 92 as shown in FIG. 7. The support loop 82 of allows the seat base frame 64 to swing, thereby permitting the articulated forward leg 68 to move between its raised and lowered positions.

The carriage portion 56 is only partially illustrated in FIG. 7 with some parts removed to better show the operative elements thereof. The carriage portion 56 includes guide rollers 98 that are supported on appropriate roller carriage guides 100. The release bar 66 is connected to the interlock 70 by a release bar connector 104.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In combination, a modular center seat/console and a track for a vehicle interior having a front row of seats arranged with a first space between a left front seat and a right front seat, the left front seat having an arm rest having a bottom surface at a first height and the right front seat having an armrest having a bottom surface at the first height, a rear row of seats arranged with a second space between a left rear seat and a right rear seat, the track extending from the first space to the second space, the modular center seat/console comprising:

a seat base and seat back that may be positioned to form a bench seat in conjunction with the left rear seat and the right rear seat in a first position, and wherein the seat back may be folded over the seat base to form a center console in a second position, the center seat/console being assembled to the track for movement between the first space and the second space; and wherein the modular center seat/console is disposed at a second height that is above the first height when in the second space and wherein the modular seat/console is adjusted vertically to be disposed at a third height that is below the first height when in the first position such that the modular seat/console fits below the armrests of the front seats.

2. The modular center seat/console and track of claim 1 further comprising a plurality of legs that support the seat base relative to the track wherein the angular orientation of the legs may be changed and locked in one of a plurality of positions to change the height of the seat base.

3. The modular center seat/console and track of claim 1 wherein the seat back may not be placed in the first position at a location forward of a predetermined position.

4. The modular center seat/console and track of claim 1 further comprising a lock that secures the modular center seat/console in a selected position on the track.

5. The modular center seat/console and track of claim 4 wherein the lock may be used to selectively secure the modular center seat/console to the track in a rear most position between the left rear seat and the right rear seat, in a forward position between the left front seat and the right front seat, and in an intermediate position relative to the first and second spaces in front of the rear row of seats and behind the front row of seats.

6. The modular center seat/console and track of claim 1 wherein the left rear seat and the right rear seat are attached to a vehicle for movement between a sub-floor stowed position in a stowage well and a seating position.

7. The modular center seat/console and track of claim 1 further comprising a vehicle floor having a nominal height wherein the track is secured to the vehicle floor without extending above the nominal height.

8. A combination of a modular center seat/console assembly and a track for use with a vehicle, the track extends between a first row of seats and a second row of seats on a floor of a vehicle, the combination comprising:

a seat base;

a seat back pivotally attached to the seat base for movement between a seating position and a console position;

an articulated linkage connecting the seat base to a carriage portion that guides the movement of the modular center console along the track on the floor of the vehicle, the linkage being adjustable to change the spacing between the seat base and the floor of the vehicle when the seat back is in the console position, wherein the modular center seat/console assembly is movable fore-and-aft to a position between the two rows of seats, the linkage including a pivot link that is pivotally connected to the seat base and also to the carriage portion wherein the height of the modular center seat/console assembly may be adjusted to different heights by pivoting the pivot link depending upon whether the modular center seat/console assembly is located near the first or second rows of seats.

9. The combination of claim 8 wherein the articulated linkage further comprises a plurality of legs that support the seat base relative to the track wherein the angular orientation of the legs may be changed and locked in one of a plurality of positions to change the height of the seat base.

10. The combination of claim 8 further comprising a lock that secures the modular center seat/console in a selected position on the track.

11. The combination of claim 10 wherein the lock may be used to selectively secure the modular center seat/console to the track in a rear most position between a left rear seat and a right rear seat, in a forward position between a left front seat and a right front seat, and in an intermediate position relative to the first and second spaces in front of the second row of seats and behind the first row of seats.

12. The combination of claim 8 further comprising the vehicle floor having a nominal height wherein the track is secured to the vehicle floor without extending above the nominal height.

13. The combination of claim 8 wherein the articulated linkage comprises at least two four bar links wherein the seat base is one of the links and a carriage that attaches to the track is one of the links and the other two links are members that extend vertically between the seat base and the carriage.

14. The combination of claim 8 wherein the seat back has a rear surface in a first position that is reoriented to be a top surface in a second position, the top surface having cup holders and a table top surface.

15. A combination of a modular center seat/console assembly and a track for use with a vehicle, wherein the track extends between a first row of seats and a second row of seats on a floor of a vehicle, the modular center seat/console assembly and track comprising:

a seat base;

a seat back pivotally attached to the seat base for movement between a seating position and a console position;

an articulated linkage connecting the seat base to the track on the floor of the vehicle, the linkage being adjustable to change the spacing between the seat base and the floor of the vehicle when the seat back is in the console position, wherein the modular center seat/console assembly is movable fore-and-aft to a position between the two rows of seats; and means for adjusting the height of the modular center seat/console assembly to different heights depending upon whether the modular center seat/console assembly is located near the first or second rows of seats.

\* \* \* \* \*